Figure 21:
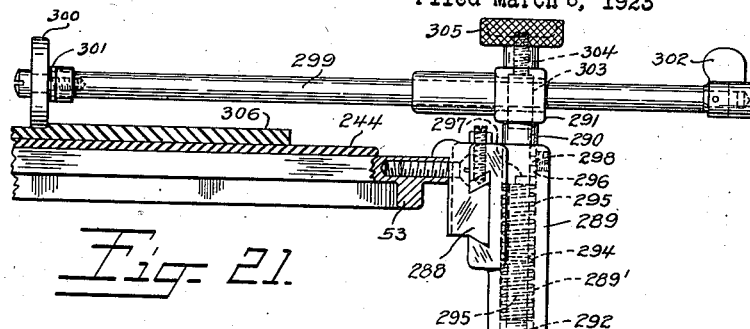

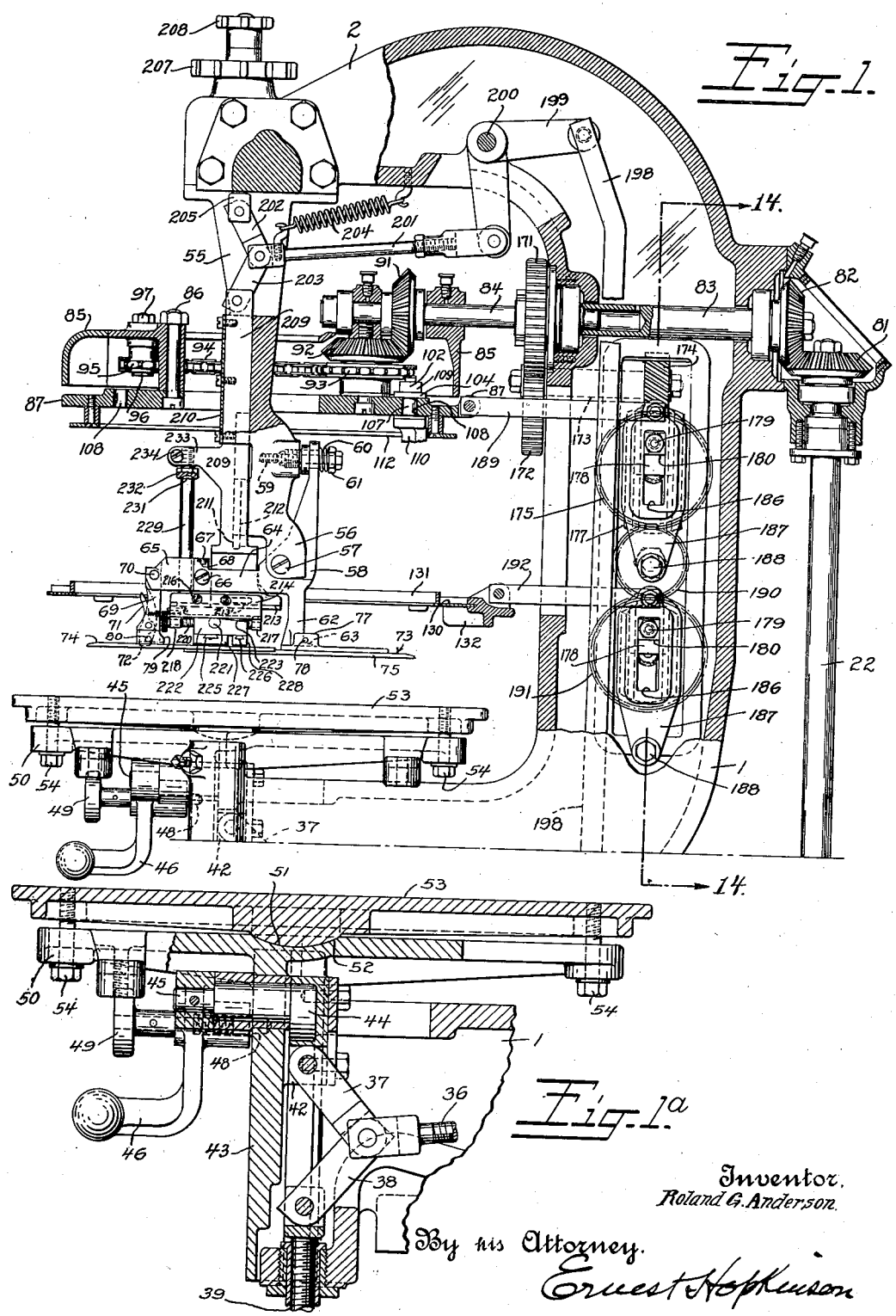

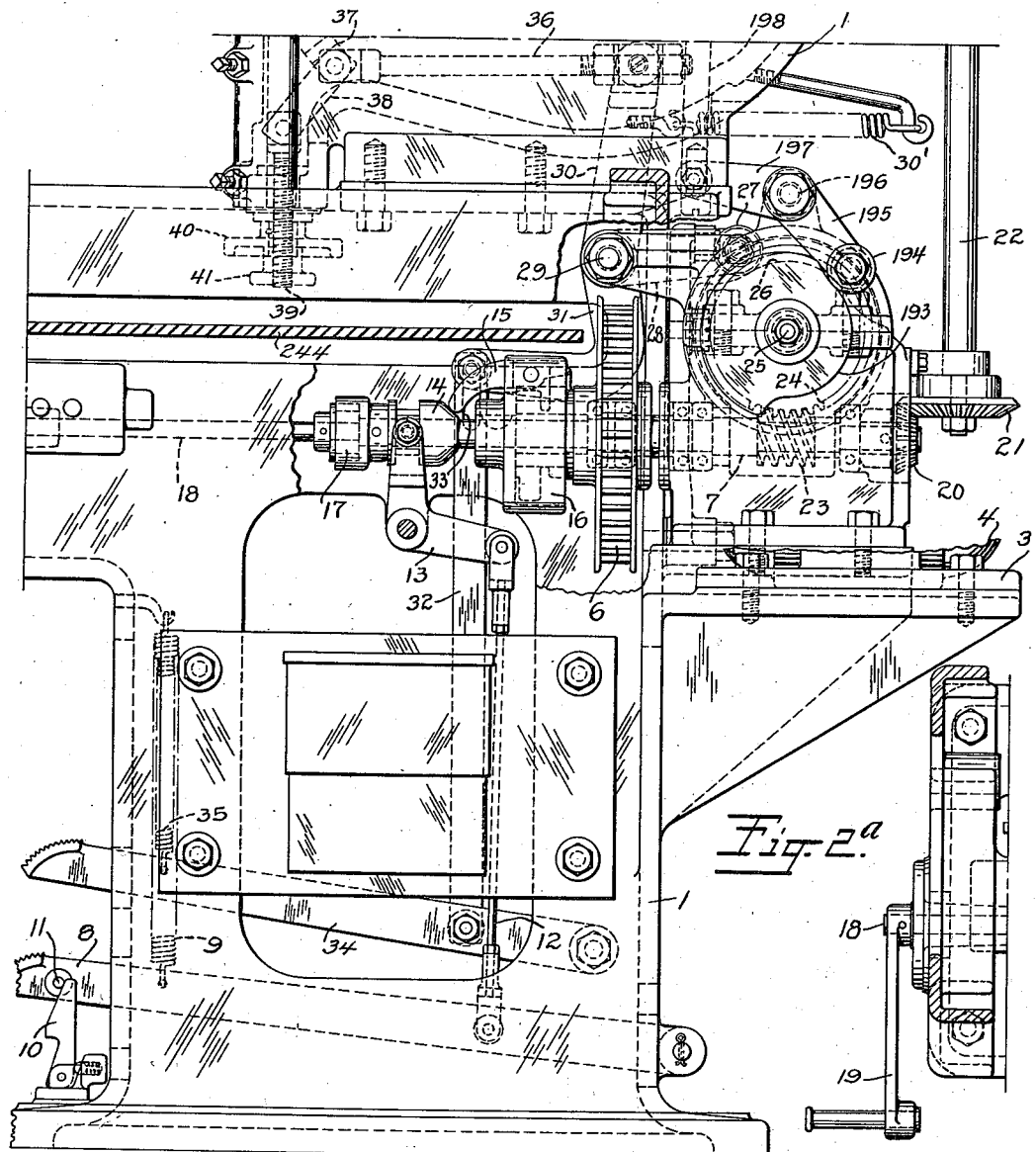

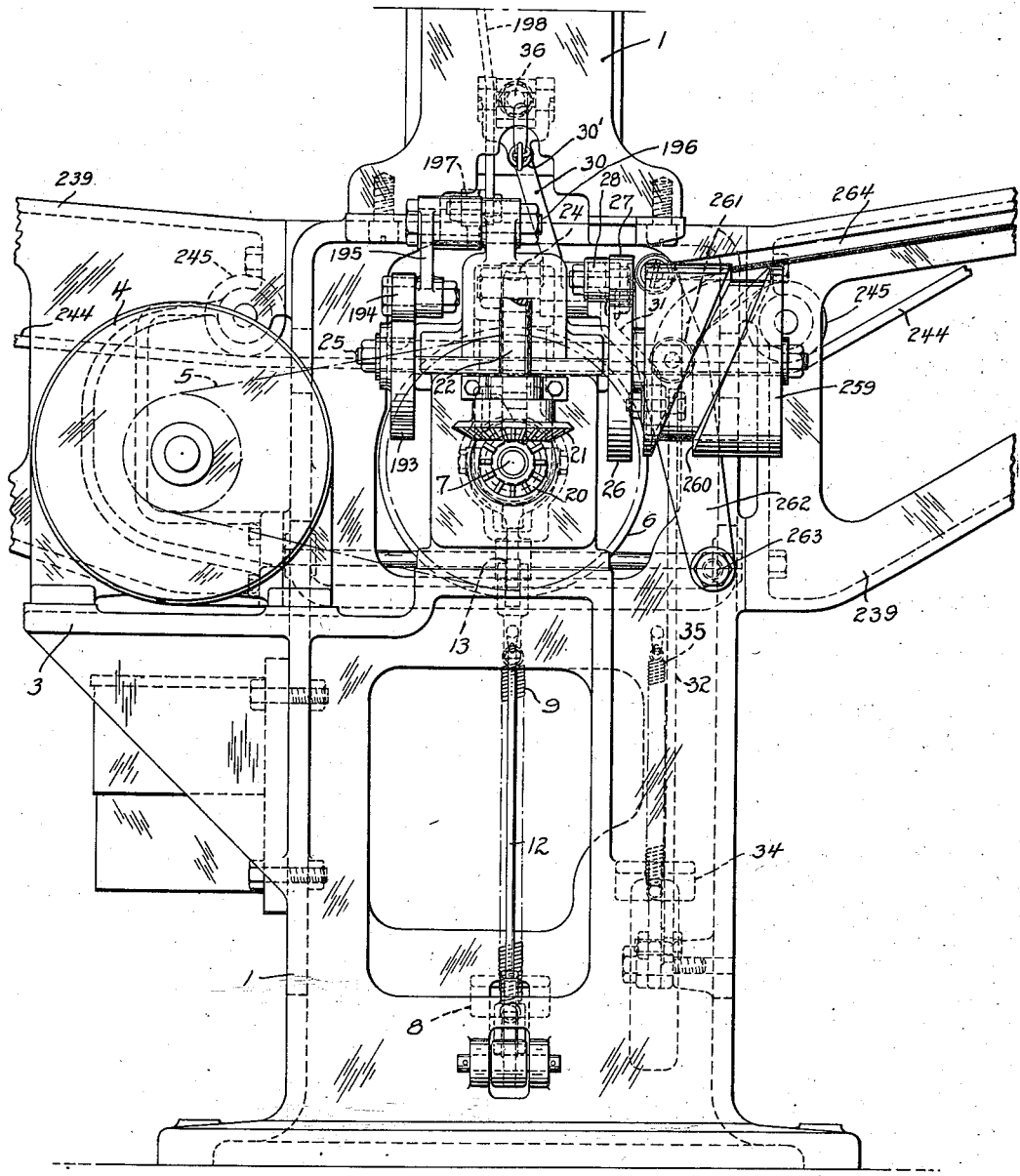

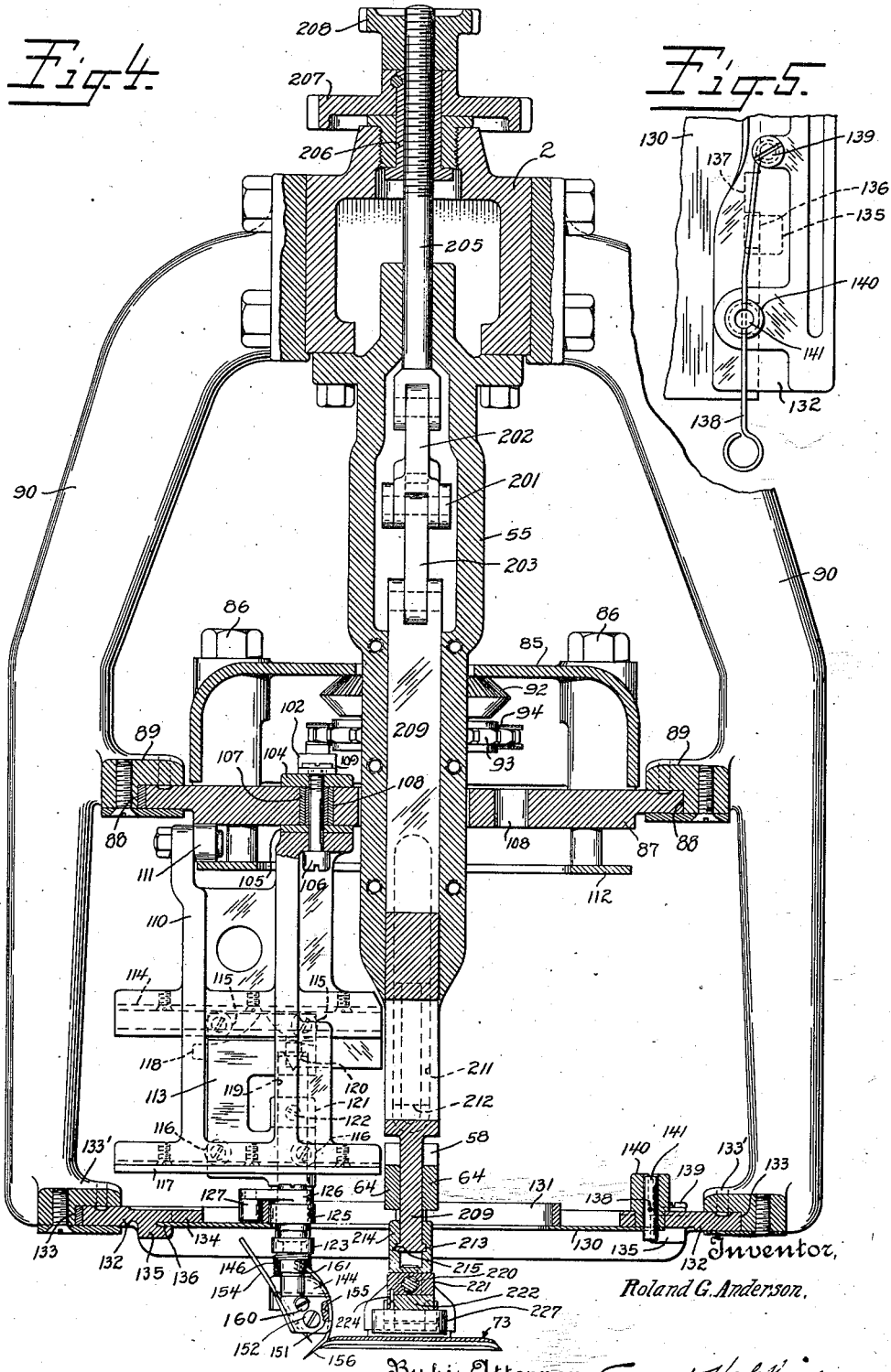

Nov. 13, 1928.
R. G. ANDERSON
1,691,795
BLANK CUTTING MACHINE
Filed March 6, 1923   9 Sheets-Sheet 5
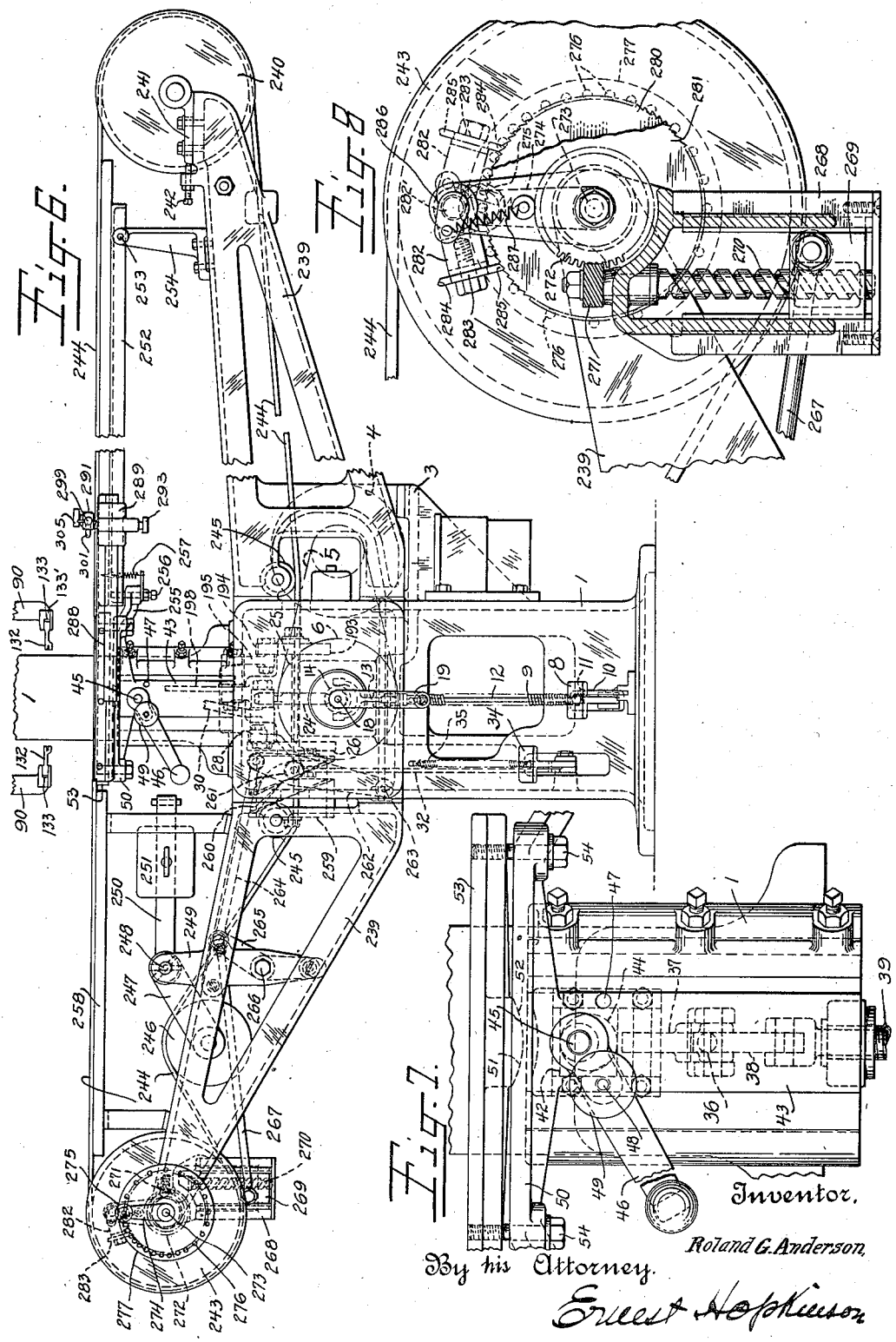
Inventor,
Roland G. Anderson,
By his Attorney.
Ernest Hopkinson

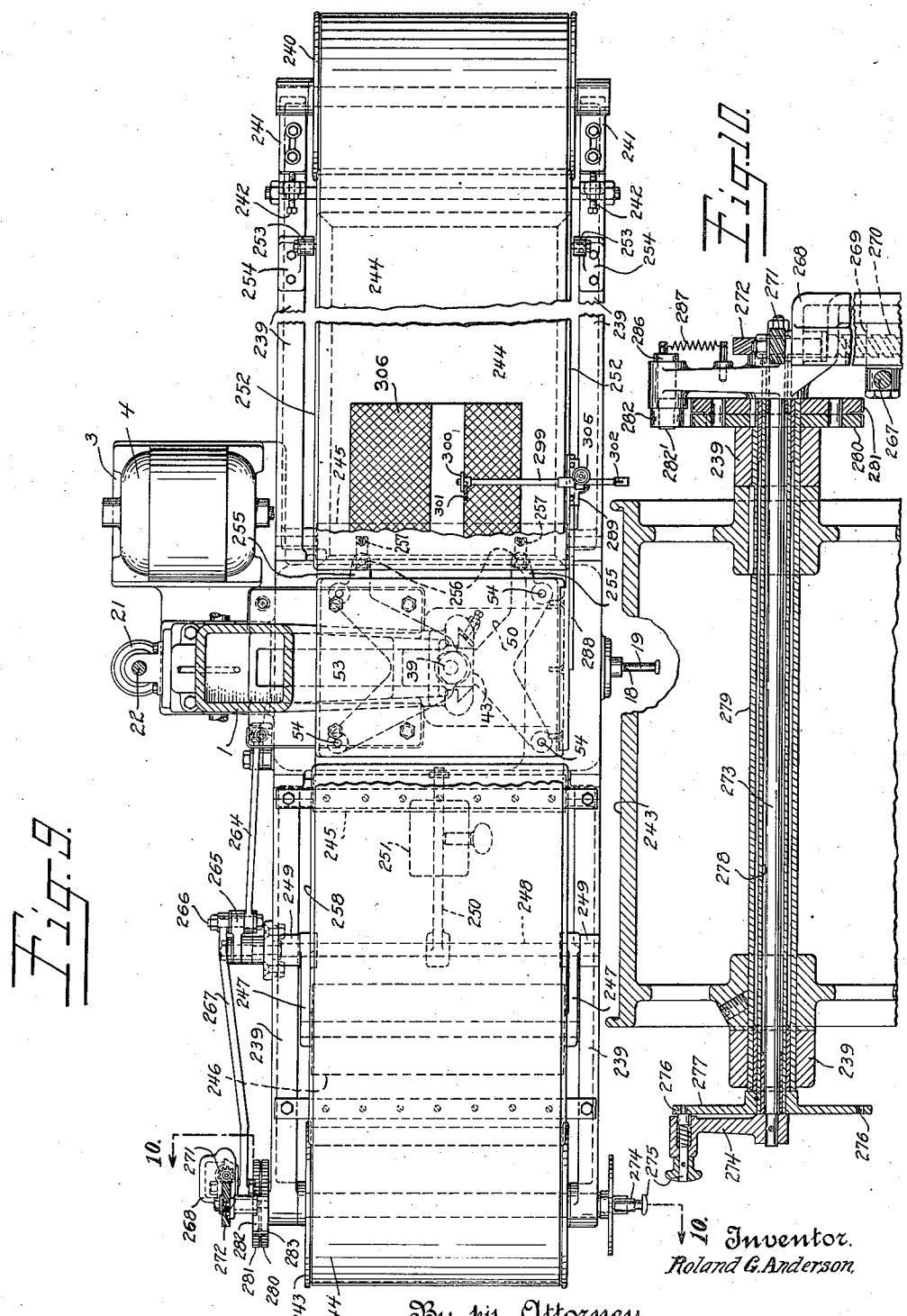

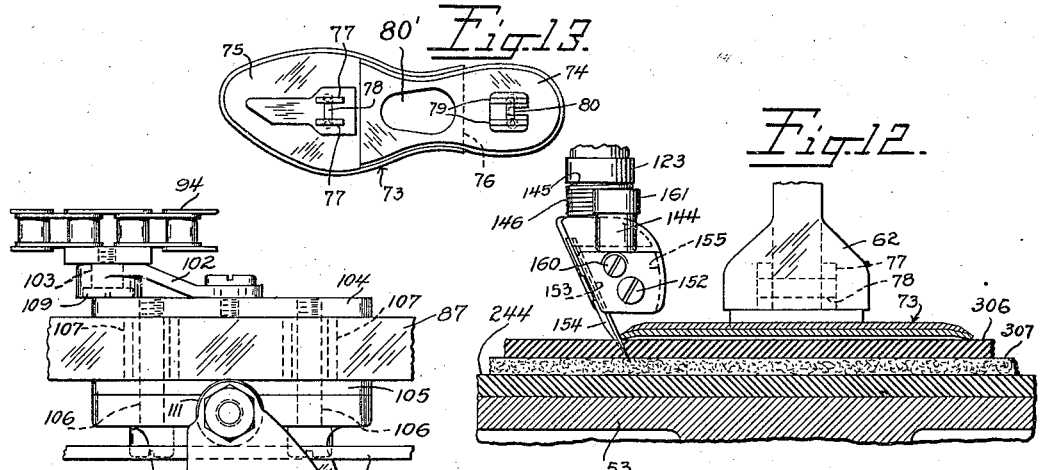

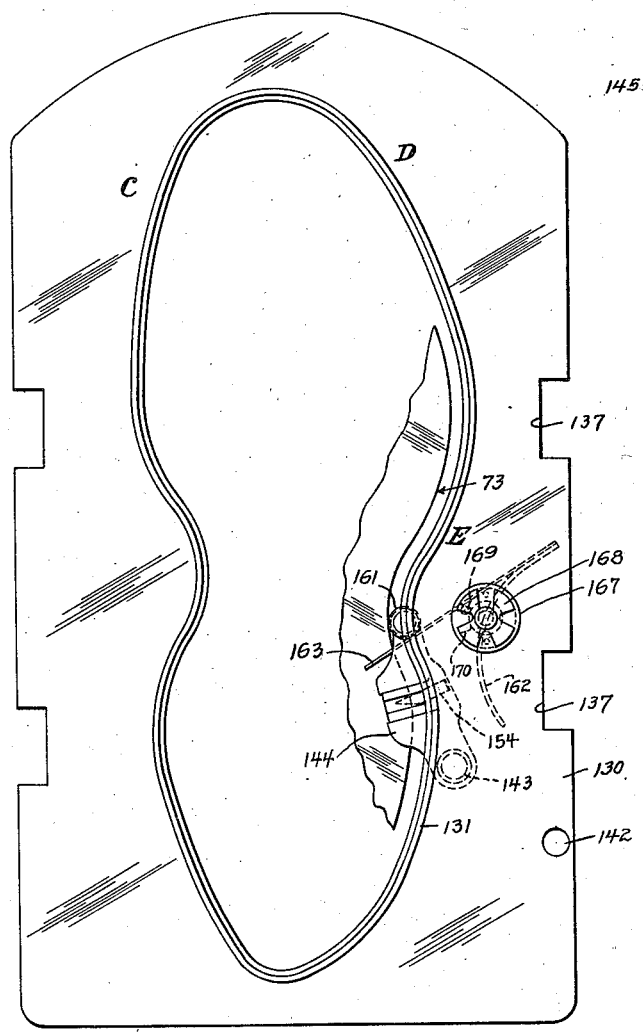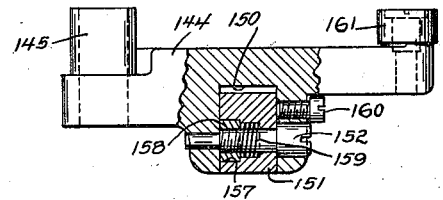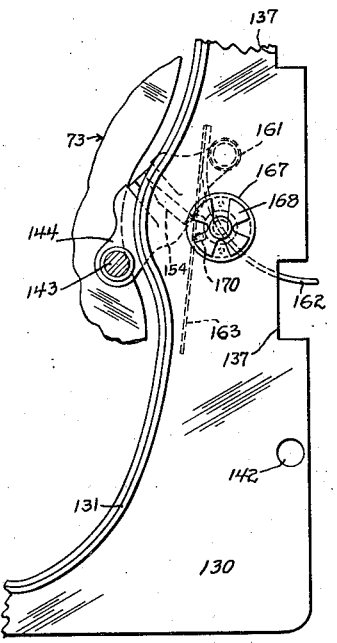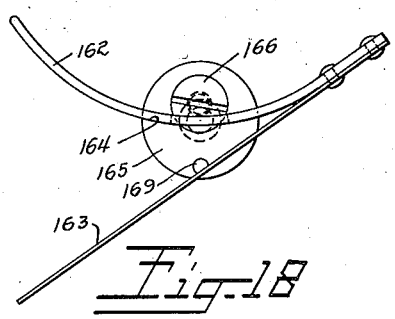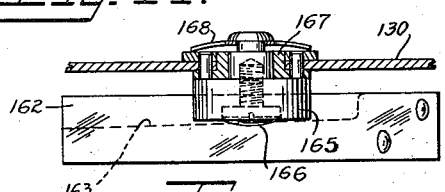

Nov. 13, 1928.  R. G. ANDERSON  1,691,795

BLANK CUTTING MACHINE

Filed March 6, 1923  9 Sheets-Sheet 9

Inventor.
Roland G. Anderson,
By his Attorney.
Ernest Hopkinson

Patented Nov. 13, 1928.

1,691,795

UNITED STATES PATENT OFFICE.

ROLAND G. ANDERSON, OF MORRIS COVE, CONNECTICUT, ASSIGNOR, BY MESNE ASSIGNMENTS, TO WELLMAN COMPANY, OF MEDFORD, MASSACHUSETTS, A CORPORATION OF MAINE.

BLANK-CUTTING MACHINE.

Application filed March 6, 1923. Serial No. 623,141.

This invention relates to a machine for cutting and embossing blanks, more particularly to a machine for cutting rubber soles from sheet stock and embossing the same.

Machines for cutting blanks such as rubber soles from sheet stock have been known for many years, and a large number of patents have been taken out covering such devices. As far as I am aware, however, the rubber sole cutting machines at present in use are confined to substantially one type, namely that in which the stock is clamped between a sole pattern and work bed and a knife driven around the edge of the pattern to cut the sole. In order to provide such flexibility in the machine that it may cut different sizes of soles the knife-supporting mechanism is formed of a number of movably connected parts extending between the knife proper and a driving means. Adjacent the driving means the knife-supporting mechanism is constrained by the guide to follow a more or less extended closed path, and at an intermediate point this mechanism is further constrained by a device known as a leader to follow a closed path which more closely approximates the form of the sole to be cut, but which is not necessarily co-extensive with the sole, and finally the knife itself directly follows the pattern from which the sole is to be cut. In order to further provide for different sizes of sole patterns the guide for the driving means and the leader are both movable in a plane parallel to that of the stock, and their actuating mechanisms are so formed that during the cutting of an intermediate size sole the guide and leader may be held stationary, or approximately so, while when cutting a large sole the guide and leader are given a plus movement synchronous with the knife adjacent each end of its path in order to more closely approximate the path of the knife around the pattern and when cutting small sizes the guide and leader are given a minus movement at each end of the knife path for the same purpose.

Rubber sole stock is ordinarily calendered by the use of an engraved roll in such manner as to provide a longitudinal knurled or otherwise roughened surface strip on the stock from which the ball portion of the sole may be cut, an intermediate slightly thinner smooth portion corresponding to the shank portion of a sole, and another thickened knurled surface strip corresponding to the heel portion of the sole (see Fig. 9). The shank portion of a sole is usually provided with an emblem such as a trademark which is formed by a correspondingly engraved portion of the calender roll. The larger factories usually have quite a number of different brands and it is therefore necessary in forming the sole stock that these different brands be impressed on. However, owing to the expense of the calender rolls, the space occupied by them, and the time taken in exchanging them, it is impracticable to provide a separate engraved roll for each brand used. Hence it is customary to engrave the shank portion of a roll with two series of brand marks, which for convenience may be designated brand "A" and brand "B," the brand "B" marks alternating on the roll with those of brand "A." A calendered sheet coming from such a roll will have the marks "A" and "B" alternately impressed on the smooth long portion corresponding to the shank portion of the sole. This calendered stock is cut into pieces of a convenient length to be handled by the operator, and if he is cutting a ticket of soles containing brand "A" for instance, he feeds the stock under the sole cutting mechanism and cuts out soles around the brand "A" only, while the intermediate stock portions marked with brand "B" become scrap. In a similar manner if a ticket of soles containing the brand "B" be desired the intermediate portions of stock containing the "A" brand become scrap. Moreover, the operator cannot manually feed the stock accurately enough to uniformly dispose the brand mark at the center of the shank on the cut sole. Before proceeding to cut the stock the operator with a hand stamp impresses a size mark adjacent each brand which he is to cut. As these size marks are stamped into the stock they fill up and become practically illegible when the finished article is varnished before vulcanizing it, and it is therefore necessary ordinarily to again mark the sizes on the soles by printing in colors.

The machines at present in use, so far as I am aware, are capable of cutting the sole with a variable angle bevel, but this bevel is a top bevel extending outwardly from the knurled wearing surface to the attaching surface, which forms what is known as a plain edge sole. A large number of footwear articles, however, are provided with what is known as a rolled edge sole in which the sole is rolled up around the edge of the article for some distance on the upper. Such soles must be cut with an under bevel, that is, one that extends inwardly from the knurled wearing surface of the sole. The machines at present in use can only cut such a sole by reversing the stock in such manner as to present its rear or smooth attaching surface to the knife. This method is highly objectionable for a number of reasons. In the first place the operator cannot then accurately locate the outer smooth shank portion of the sole with reference to the pattern, and in the second place he cannot accurately locate the brand mark so that it will be centered with respect to the sides of the sole. The only guide which he has is the slightly raised surface formed on the bottom by the stamped size marks, and this is ordinarily made plainer by the operator by rubbing chalk over the raised portions or by scratching them with a knife. It is obvious that this consumes time and in addition at best it is a very poor means of locating the brand mark since the stamped size marks are themselves not uniformly placed by the operator when using a hand stamp. It has been proposed, as disclosed in patent to Knight, No. 436,359, to stamp a mark on a sole simultaneously with the cutting operation by means of co-operating dies on opposite sides of the stock. However, this method is impracticable and open to many objections, and it is significant that although the patent has been issued for over thirty years the antiquated and objectionable method of marking the emblem on the sole during the calendering is still in extensive use. A stamping mechanism of the type shown in the Knight patent is objectionable for the reason that one of the dies is rigid with the sole pattern and it therefore requires a relatively heavy pressure on the sole pattern, while owing to the plastic and tacky nature of the sole stock it is essential that it be clamped with just sufficient pressure to prevent movement during the sole cutting operation, otherwise it will become marred. The dies are also not readily exchangeable when it is desired to use a different brand or cut a different size and they cannot be adjusted relatively to the sole pattern when cutting different sizes, or for different thicknesses of stock. Moreover with the use of co-operating dies a clear cut raised impression cannot be obtained owing to the nature of the material to be embossed. If a heavy pressure is used sufficient to cause an actual flow of the rubber stock the entire portion of the stock within the area of the dies becomes very much thinned out and weakened and it is liable to blister at that point during vulcanization. On the other hand if a light pressure be used the stock, which is tough and elastic as well as plastic, does not flow sufficiently but merely stretches into the recesses in the die, and as a result when the pressure is released the stock stretches back again, thereby causing a blurred and poor impression. It is also obvious that not only is the machine shown in the Knight patent of itself incapable of cutting sole stock when reversed, but the stamping mechanism would also be rendered inoperative should the stock be reversed.

A number of patents have also been issued for conveyor mechanism for automatically feeding the stock to sole cutting machines, but these devices are impractical and as far as I am aware there is no machine of the type described at present in use for cutting rubber soles in which an automatic feed is provided. As a result the operator must feed the stock manually between the work bed and pattern and relatively move them to clamp the stock during the cutting out of a sole, then release the stock and feed it forward for the next cutting operation.

An object of my invention is to provide an improved wholly automatic machine for cutting blanks. Another object is to provide a machine for cutting rubber soles or other blanks with any desired angle of cut and with either a top bevel or an under bevel. Still another object is to provide an improved mechanism for embossing an emblem and size or any other indicia in a definite position on a sole or other blank simultaneously with the cutting operation but independently thereof. Still another object is to emboss by the use of a single die. A further object is to provide an improved form of work bed. A still further object is to provide an improved support for the cutting blade. A still further object is to provide an improved form of sole pattern support. A still further object is to provide an improved form of conveyor. Finally, the invention aims generally to improve sole cutting mechanism as regards simplicity and durability, ease of operation, capacity, accuracy, and quietness.

Figure 22:
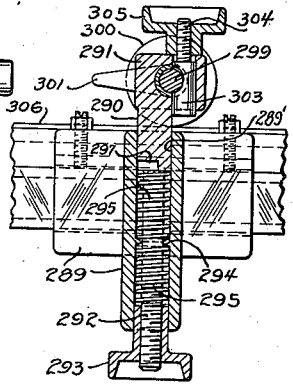
Figure 23:
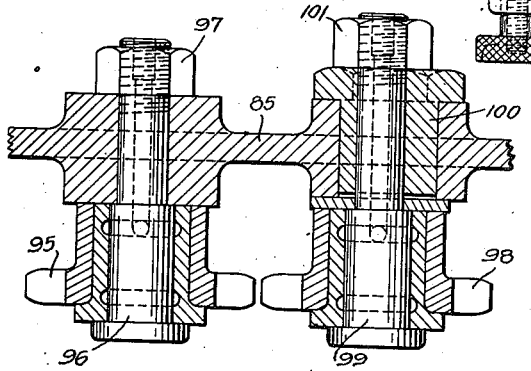
Figure 25:
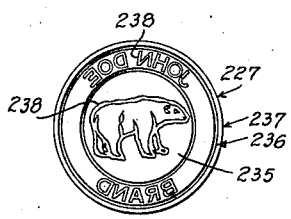
Figure 26:
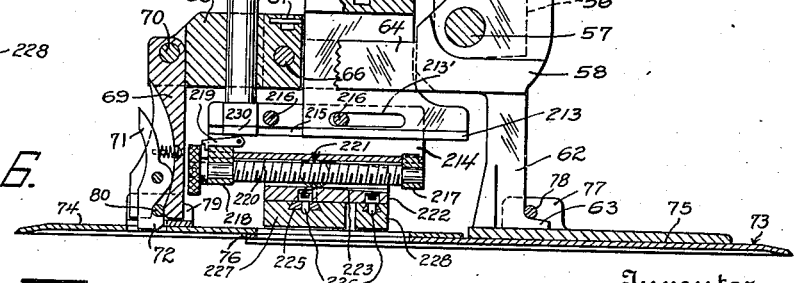
Figure 24:
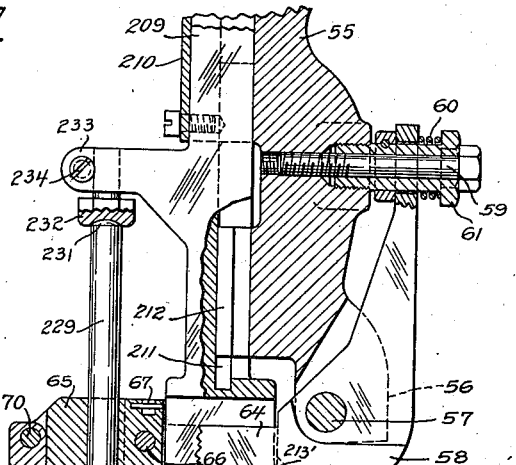

For a detailed disclosure of the invention reference is had to the accompanying specification and drawings in which:

Fig. 1 is a side elevation, partly in section, of the upper part of the machine. Fig. 1ª is a detail sectional view on a large scale of the work bed and its support. Fig. 2 is a side elevation of the portion of the machine below that shown in Fig. 1, with the conveyor mechanism omitted. Fig. 2ª is a part sectional view of a part of the machine to the left of Fig. 2. Fig. 3 is a partly broken away rear elevation of the lower part of the machine. Fig. 4 is an enlarged front elevation, partly in section, of the cutting and embossing mechanism. Fig. 5 is a detail view of a latch for locking the leader in position. Fig. 6 is a front elevation illustrating the conveyor mechanism. Fig. 7 is an enlarged detail front elevation of the work bed and its support. Fig. 8 is an enlarged detail of the driving mechanism for the conveyor. Fig. 9 is a plan of the conveyor mechanism. Fig. 10 is an enlarged sectional view of the drive roll of the conveyor. Fig. 11 is an enlarged elevation, partly in section, of the cutting mechanism and its actuating means. Fig. 12 is a sectional detail view illustrating the manner of cutting a roll edge sole. Fig. 13 is a plan of a sole pattern. Fig. 14 is a sectional detail of the actuating means for the drive bonnet and leader. Fig. 15 is a section on the line 15—15 of Fig. 14. Fig. 16 is a detail view illustrating the tracker for withdrawing the knife when cutting a roll edge sole. Fig. 17 is a similar view showing the parts in another position. Fig. 18 is a bottom plan of the knife tracker. Fig. 19 is a side elevation thereof partly in section. Fig. 20 is a part sectional view of the knife block holder. Fig. 21 is a side elevation of a gauge. Fig. 22 is a front elevation of the gauge, partly in section. Fig. 23 is a detail of the chain tightening mechanism. Fig. 24 is an enlarged view, partly in central longitudinal section, of the embossing mechanism and sole pattern support. Fig. 25 is a plan of an embossing die; and Fig. 26 is a similar plan of a size embossing die.

*Main drive and work bed lifting mechanism.*

Referring to the drawings, more particularly to Figs. 1, 2, and 3, the numeral 1 designates the main frame of the machine, which at its upper end is provided with an overhanging arm 2, and at its rear with a supporting bracket 3 for the motor 4. The motor by means of the chain 5 drives a sprocket 6 freely mounted on a shaft 7, and the sprocket is clutched to the shaft in driving relation by the following parts. Pivotally mounted at the base of the machine is a foot lever 8 normally held in raised position by the tension spring 9, and below the foot lever there is provided a spring pressed dog 10 adapted to engage the pin 11 carried by the lever upon depression of the latter. A link 12 is attached at its lower end to the lever 8, and at its upper end to one arm of the bell crank 13, the other arm of the bell crank being pivotally attached to a sleeve 14 slidably mounted on the shaft 7. The sleeve 14 upon being moved forwardly actuates the pivoted arm 15 of a well-known form of clutch so as to tighten the clutch member 16 on a co-operating clutch member formed by the hub of sprocket 6. One end of the shaft 7 is connected by a one-way clutch 17 to a second shaft 18, the latter being provided at its other end with the operating crank 19 by which the machine may be manually operated when desired. A gear 20 mounted at the rear end of the shaft 7 meshes with a gear 21 carried by a vertical shaft 22, which latter operates the cutting mechanism in a manner to be later described. Also mounted on the shaft 7 is a worm 23 meshing with a worm wheel 24 mounted on a transverse cam shaft 25, and secured on this shaft is a cam 26. Co-operating with the periphery of this cam is a cam roll 27 mounted on an arm 28 secured to a rock shaft 29, and also secured to this shaft is an upwardly extending rock arm 30 to which is connected a tension spring 30' which maintains the cam roll continuously in contact with the cam. The arm 30 through suitable mechanism raises and lowers the work bed. In order that the work bed may also be manually raised when desired an angle arm 31 is also connected at one end to the rock shaft 29, while the other end of the arm has a lost motion connection with the link 32 by means of the slot 33 in said link. The lower end of the link 32 is pivotally connected to a foot lever 34 pivoted in the frame, which foot lever is normally held in raised position by the tension spring 35. A link 36 is pivotally and adjustably attached at one end to the rock arm 30 while its other end is connected to a toggle formed by the links 37 and 38. The lower end of the link 38 is pivotally connected to an adjusting rod 39, which latter is threadedly connected to a small hand wheel 40 rotatable in the frame 1, a lock nut 41 being provided for holding the parts in adjusted position. The upper link 37 of the toggle is pivotally connected to a small slide block 42 movable in a second slide block 43 slidable in a dove-tailed groove in the frame 1 (Fig. 7). A circular head 44 is rotatable in a recess cut across the slide block 42, this head being eccentrically mounted on a stub shaft 45 rotatably mounted in the slide block 43, and an operating handle or crank 46 is pinned to the opposite end of the shaft. In order to hold the crank and the slide block 42 in adjusted position a pair of oppositely disposed recesses 47 are provided in the slide block 43, with which recesses a spring pressed detent 48 carried by the crank is adapted to engage, a handle 49 being provided on the detent for withdrawing it. A work bed support 50 is disposed at the upper end of the slide block 43 and in the present instance is formed integral therewith. In order to save weight the work bed support may be formed as shown in Figs. 1ª and 9 with four arms. The work bed support is provided at its central portion with a spherically curved recess 51, with which engages a correspondingly curved projection 52 on the bottom of the work bed 53. It will be seen that by this construction the work bed may be universally adjusted on its support, and secured in adjusted position by the screws 54 extending through the support and threadedly connected to the work bed.

*Cutting mechanism.*

Depending from the overhanging arm 2 is a bracket 55 (see Figs. 1 and 24) provided at its lower end with an off-set extension 56 in which is pivotally mounted at 57 a sole pattern holder or support 58. The pattern support at its upper end encircles and is freely movable on a pin 59 mounted in bracket 55, and is urged to the left in Fig. 1 by a coiled spring 60, the latter also surrounding the pin, and its pressure may be adjusted by the nut 61. Depending from the pattern holder 58 is an arm 62 provided at the bottom with a toe 63 adapted to engage the sole pattern. The forward portion of the pattern holder is split to provide two spaced arms 64 between the ends of which may be secured a pattern holder extension 65 by means of the bolt 66. In order to prevent pivotal movement of the extension 65 on the arms 64 it is provided with a cross-bar 67 pinned thereto, the projecting ends of which are adapted to fit into corresponding recesses 68 formed in the arms 64. A second arm 69 is attached to the extension 65 by means of the bolt 70, and it may be here noted that when desired the extension 65 may be removed and the arm 69 directly secured to the arms 64 by the bolt 66. Mounted in the arm 69 is a pivoted spring pressed latch 71 having at its lower end a bevelled toe 72 for engaging the sole pattern. The sole pattern (see Figs. 13 and 24) designated generally by the numeral 73 is in the present instance formed of a sheet metal heel portion 74 superposed on a toe portion 75, the two parts overlapping to form a shoulder 76 adapted to engage the breast of the thickened heel section of the sole stock. The forward end of the sole pattern is provided with upstanding lugs 77, between which extends a pin 78, beneath which the toe 63 may engage. The heel end of the pattern is also provided with a pair of upstanding lugs 79, between which extends a pin 80, adapted to snap over the toe 72 of the latch 71, to thereby secure the sole pattern in position. The shank portion of the pattern is provided with an opening 80' through which may pass the embossing mechanism to be later described.

Mounted on the upper end of vertical shaft 22 is a gear 81 meshing with a gear 82 carried by a horizontal shaft 83, the forward end of which latter is tubular and telescopically keyed in any desired manner to a shaft 84 mounted in the drive bonnet 85, which latter is secured by the bolts 86 to a truck guiding plate 87, the latter being slidably mounted in channels 88 formed in extensions 89 of the depending side arms 90 secured to the overhanging arm 2 (Fig. 4). Mounted on the shaft 84 is a gear 91 meshing with a gear 92 journaled on a short shaft mounted in the truck guiding plate 87. Rigid with the gear 92 is a sprocket 93 over which runs a truck driving chain 94, this chain at its forward end passing over two small sprockets (Fig. 23), one of which 95 has a fixed bearing in the bonnet 85 by means of the stub shaft 96 and nut 97. The second sprocket 98 is also carried by the bonnet 85, but its shaft 99 is eccentrically mounted in the stud 100 rotatably adjustable in the bonnet 85. Hence by rotating the stud 100 the sprocket 98 may be moved to vary the tension of the chain 94 and then locked in position by the nut 101.

A draw bar 102 is pivotally connected at one end to the chain 94 by the stud 103 (Fig. 11), the other end of the draw bar being pivotally connected to a guide formed by the upper plate 104 and lower plate 105 slidably disposed on opposite sides of the truck guiding plate 87, the plates 104 and 105 being connected by bolts 106 on which are rotatably mounted anti-friction rolls 107, these rolls being movable in a longitudinally extended continuous guide slot 108 formed in the truck guiding plate 87. It will be noted (Fig. 11) that the draw bar 102 is provided around the stud 103 with a downwardly projecting extension 109 which slidably bears against the upper surface of plate 104, thereby forming a support which prevents sagging of the chain 94 between the sprockets. Also secured to the lower plate 105 is a knife guiding truck 110 (see Figs. 4 and 11) provided at its upper end with a thrust roller 111 disposed between the truck guiding plate 87 and a track 112 suspended below the plate. It will be seen that the truck 110 is constrained to follow exactly the pattern or shape formed by the guide slot 108. A carriage 113 is transversely movable in the truck 110, and is held in position in the truck at its top by the angular track 114 secured to the truck, against which track bear the anti-friction rolls 115, while adjacent its lower end the carriage is provided with laterally projecting anti-friction rolls 116 running in the angular track 117 carried by the truck. Inward movement of the carriage on the truck is limited by the stop 118 on the carriage adapted to engage a corresponding stop on the truck. Vertically rotatable in the carriage is a shaft 119 the upper end of which engages a coned thrust bearing 120, and downward movement of which is prevented by the bearing collar 121 secured to the shaft by the screw 122.

Rigid with the lower end of the shaft 119 is a plate 123 from one end of which projects upwardly a short shaft 124 on which are rotatably mounted a roll 125 and an arm 126 from the outer end of which latter depends a second roll 127 (see Figs. 4 and 11). The shaft 119 also carries a roll 128, and above this an arm 129, which latter supports a roll similar in all respects to the roll 127. In order to allow the carriage 113 and supported parts to more closely approximate the form of the sole to be cut a device 130 known as a leader is supplied (Figs. 4 and 16), this leader having a central opening of the approximate shape but not necessarily of the same area as the sole to be cut, and extending around this central opening is a guide flange 131, the inner side of which is engaged by the rolls 125 and 128, while the outer side is engaged by the rolls carried by the arms 126 and 129, so that the carriage 110 and supported parts are guided in a path determined by the leader flange 131. The leader is connected to a leader carrier 132, which latter is slidable in channels 133 formed in extensions 133' of the arms 90. The leader is detachably connected to the leader carrier in the following manner. The leader carrier is provided with a flange 134 overhanging a central opening and depending from the leader carrier are spaced lugs 135 provided with slots 136 (see Figs. 4 and 5), and the edge of the leader 130 is provided with cutouts 137 spaced in the same manner as the depending lugs 135. When it is desired to attach the leader it is placed beneath the leader carrier with the cutouts 137 in registry with the lugs 135, pushed up against the overhanging flange 134 and then moved longitudinally to bring the edges of the leader into the slots 136 of the lugs 135. In order to secure the leader in this position a latch is provided, which is formed of a spring arm 138 connected to the leader carrier at 139, which arm is vertically movable in the slotted bearing sleeve 140 on the leader carrier, and mounted on the arm 138 within said sleeve is a locking bolt 141 adapted to engage the opening 142 in the leader (see Figs. 16 and 17).

Rigidly connected to the plate 123 is a depending stud 143 on which is pivotally mounted a knife block holder 144, which holder has a direct bearing on the lower end of the stud and has rigidly connected thereto a sleeve 145 surrounding the upper portion of the stud. Surrounding the sleeve 145 is a coiled compression spring 146, one end of which is attached to the plate 123 while the other end is attached to a tension adjusting ring 147 rotatable on the sleeve 145 and secured in position thereon by the set screw 148. In order to take care of the upward thrust on the knife block holder 144 during the cutting operation a downwardly projecting lug 149 is connected to the lower end of the shaft 124 and slidably engages the upper surface of the knife block holder 144.

The knife block holder 144 is provided with a cut away portion 150 (Figs. 11 and 20) in which the knife block 151 is adjustably mounted by the pivot pin 152 having a bearing at each end in the knife block holder. By reference to Fig. 11 it will be seen that the knife block is provided on one side with a straight inclined surface in which is cut a dove-tailed groove 153 for the reception of the straight cutting knife 154, and by reference to Fig. 4 it will be seen that on the opposite side the knife block is provided with a curved surface in which there is formed a second dove-tailed groove 155 for the reception of a curved knife blade 156. Referring to Figs. 11 and 20 it will be seen that one end of the knife block between said inclined and curved surfaces is cut away as shown at 157 for the reception of the knife clamp 158, which latter is threadedly mounted on the pivot pin 152, a compression spring 159 being also mounted on the pivot pin 152 in engagement with the clamp. It will be seen by this construction that upon turning the pivot pin 152 in one direction the clamp 158 may be released from locking engagement at each of its ends with the corresponding knives, the coiled spring 159 aiding in separating the knife block and clamp. The knives may then be adujsted longitudinally in their slots, and upon turning the pivot pin 152 in the reverse direction the clamp 158 may be again caused to lock the knives in position in their dove-tailed grooves. The knife block and its accompanying knives may be set in any desired angular position on the pivot pin 152 and locked in such position by the set screw 160.

*Knife tracker.*

For reasons to be later explained it is desirable when cutting the roll edge or under bevelled soles to withdraw the knife blade from the sole pattern prior to releasing the stock after finishing the cutting of a sole, and to accomplish this the following mechanism is provided. Secured on the end of the knife block holder 144 is a tracker roll 161. Referring to Figs. 16 to 19 it will be seen that the leader is provided with a tracker co-operating with the roll 161 to withdraw the knife from engagement with the sole pattern. This tracker consists of a curved bar 162 and a straight spring 163 secured to the bar 162. The bar 162 is secured in a curved slot 164 on the lower side of a depending pivot pin 165 by means of the screw 166. The upper reduced portion of the pivot pin 165 is mounted in the bearing sleeve 167 carried by the leader, and held in position by the split spring washer 168 engaging the head of the pivot pin. In order to limit pivotal movement of the tracker a stop pin 169 is mounted on the pivot pin 165 and projects upwardly into a cut away portion 170 formed in the base of the bearing sleeve 167 (see Figs. 16 and 17).

*Bonnet and leader actuating means.*

When cutting an intermediate size of sole the drive bonnet 85 and leader 130 may be left stationary. However, when cutting a larger size it is desirable that both the bonnet and leader be given a plus movement in synchronism with the knife at each end of its travel around the large sole pattern, in order that the guide paths formed by the slot 108 and leader flange 131 may more closely approximate in length the length of the sole pattern. For a similar reason it is desirable when cutting a small sole that the bonnet 85 and leader 130 be given a minus movement. To accomplish this purpose the following mechanism is provided (Figs. 14 and 15). Keyed on the end of the shaft 83 is a pinion 171 meshing with a second pinion 172 carried by a shaft 173 mounted in the upper part of the frame 1. A spiral gear 174 is mounted on the opposite end of shaft 173 and engages a spiral gear 175 rigid on a tubular shaft 176 journalled in the frame 1. This shaft at its opposite end is formed with an extension block 177 provided with a dove-tailed groove for the reception of a slide block 178. Projecting from one side of the slide block is a stud 179 carrying a second slide block 180, while on its opposite side the block 178 has connected thereto a vertical rack 181 adapted to co-operate with a pinion 182 secured on the end of a shaft 183 mounted within the shaft 176. Pinned to the opposite end of the shaft 183 is an operating knob 184, and the shaft may be locked in adjusted position by the nut 185. The slide block 180 is movable in a slot 186 in a rock arm 187 pivoted to the frame of the machine at 188. Attached to the other end of the rock arm is a link 189 which at its opposite end is connected to the truck guiding plate 87. The parts 177 and 178 form in effect an adjustable crank on the shaft 176, and when the slide block 180 is disposed in alignment with the shaft 176 the crank will have a zero throw and hence the truck guiding plate 87 and entire drive bonnet 85 will remain stationary. When a large sole pattern is being used the slide block 180 is adjusted in one direction in the slot 186 to thereby give a plus movement to the drive bonnet synchronous with the movement of the knife, or in effect lengthening the guide groove 108 at each end. When a small sole pattern is being used the slide block 180 is adjusted in the opposite direction, thereby imparting a minus movement to the drive bonnet and in effect shortening the guide groove 108.

Meshing with the gear 175 is a gear 190 which in turn meshes with a gear 191, and connected to the latter is a series of parts 176–188 which are in all respects similar to the adjustable crank parts just decribed. The upper end of the rock arm 187 actuated by this gear 191 is connected by a link 192 to the leader carrier 132, and by varying the position of the second slide block 180 the leader 130 can be given a plus or minus movement synchronous with the movement of the knife as above described for the drive bonnet.

*Embossing mechanism.*

Mounted on the cam shaft 25 (Figs. 2 and 3) is a cam 193 against the periphery of which bears a cam roll 194 carried by the rock arm 195 mounted on a rock 196, and also mounted on the rock shaft 196 is a second rock arm 197 connected by the link 198 (Figs. 1 and 2) to one arm of a bell crank 199 pivoted in the overhanging arm 2 at 200. A link 201 is adjustably connected at one end to the other arm of the bell crank, and to the opposite end of the link a toggle formed by the links 202 and 203 is connected. In order to maintain the toggle normally in a broken position a tension spring 204 is connected to the link 201 and to the overhanging arm 2. The toggle link 202 is also connected (Fig. 4) to an adjusting rod 205 which is threadedly connected to a bearing sleeve 206 rotatable in the arm 2, which sleeve is pinned to a hand nut 207. In order to lock the parts in adjusted position a nut 208 is also threaded on the rod 205 and adapted to engage the hand nut 207. The toggle link 203 is connected (Figs. 1 and 4) to a slide 209 movable in a channel in the bracket 55, said slide being retained in position by the plate 210. Adjacent its lower end (Figs. 4 and 24) the slide is provided with a T-shaped slot 211 with which slidably engages a T-shaped projection 212 formed on the bracket 55. The lower end of the slide 209 is reduced in thickness to pass between the arms 64 of the sole pattern support and at the bottom is provided with oppositely disposed guide flanges 213. An embossing slide block 214, which is substantially U-shaped in cross section, is provided with guide grooves 215 adapted to fit over the flanges 213. In order to secure the embossing slide block in adjusted position on the lower end of the slide 209 set screws 216 are provided extending through the opposite walls of the slide block, one of said screws also passing through the slot 213' in the lower end of the slide 209. Fixedly secured in one end of the block 214 is a depending bearing lug 217, while at the other end of the block a second bearing lug 218 is removably mounted and held in position by a latch 219. Rotatably mounted in the lugs 217 and 218 is an adjusting screw 220 the threaded portion of which engages a transverse pivot pin 221 the ends of which are pivotally mounted in the side walls of a die block 222, also of approximately U-shaped cross section. It will be noted from Fig. 1 that the tops of the walls of the block 222 are slightly inclined at one end as shown at 223 in order that the block may have a limited pivotal movement on the pin 221. In order to prevent lateral movement of the block 222 on the pivot pin a small pin 224 (Fig. 4) projects from the block into a groove in the pin 221. In the present instance the die block is shown as adapted to support two dies, one for embossing the size and the other for embossing a trademark or other emblem. In order to secure the dies in position dove-tail slides 225 are secured to the bottom of the block through which are adapted to project springpressed detents 226. The dies 227 and 228 are provided with dove-tailed grooves fitting the respective slides and are held in position by the engagement of the detents 226 with corresponding recesses in the dies. As shown in Figs. 1 and 24 the machine is arranged for cutting a relatively large sole, in which case a relatively large embossing slide block 214 and die block 222 are also used, and in order to prevent strain on the projecting portion of the block 214 a thrust rod 229 is provided which is formed on its lower end with guide flanges 230 by which it may slidably engage the block 214, and at its upper end with a spherically curved head 231 having a bearing in a corresponding recess in the head of an adjusting screw 232 threaded in the split extension 233 of the slide 209. The adjusting screw is locked in position by the clamping screw 234 engaging the split ends of the extension 233. The embossing dies operate on the stock through the opening 80' in the sole pattern.

Owing to the peculiar nature of unvulcanized rubber it cannot be successfully stamped by the use of the ordinary cooperating dies, for as before pointed out if these dies are brought together under heavy pressure sufficient to cause an actual flow of the rubber stock the stock escapes from between the dies and the material becomes too much thinned out at the point where stamped and is so weakened as to render defective articles on which the stamping is placed. On the other hand owing to the elastic nature of the stock, if a light pressure be used the stock does not flow sufficiently but merely stretches into the recesses of the dies and when the pressure is released the stock stretches back again so that a defective and improperly filled-out stamped design is formed. Referring to Fig. 25 there is shown an embossing die 227 which in the present instance is adapted for embossing a rubber stock with a trademark or other emblem. The die is formed with a flat face 235 in which adjacent the periphery is formed a recess 236, leaving around the outside of the recess a narrow flat surface 237 which in the case of the die illustrated is annular. Within the boundary of recess 236 the die is formed with any other desired recesses 238 for the purpose of forming embossed figures, designs, letters, etc. The size die 228 shown in Fig. 26 is in general similar but is of an elongated more or less oval shape. In all cases the dies are provided with a recess adjacent and concentric with the periphery so as to form outside of the recess a flattened closed peripheral figure, the purpose of which is to prevent flowing of the rubber stock outside of the die during the embossing operation.

Conveyor.

Attached to each side of the main frame 1 are pairs of conveyor supporting brackets 239 (Figs. 3, 6 and 9), and mounted in the ends of the one of the pairs is a conveyor roll 240 carried by adjustable bearing brackets 241, which may be adjusted in the usual manner by the screws 242. Secured in the ends of the opposite pair of brackets 239 is a second or drive roll 243, and over the rolls passes a conveyor 244 which also moves across the work bed 53. The lower portion of the conveyor passes under idler rolls 245 and also passes over a tension roll 246, which latter roll is provided for the purpose of maintaining the tension of the conveyor even as the latter is raised and lowered by the work bed 53. The tension roll is supported by two arms 247 pinned to a shaft 248 journalled in extensions 249 on the brackets 239. Also pinned to the shaft 248 is an arm 250 on which is adjustably secured a counterweight 251. Owing to the rise and fall of the work bed 53 the conveyor and the supported sole stock would tend to sag at each side of the work bed as the latter is raised, and it is therefore desirable to supply tables at each side to prevent sagging. Referring to Fig. 6 there is shown a supporting table 252 which is pivotally mounted at one end at 253 on the brackets 254. Adjacent the other end of the table brackets 255 extend outwardly from the work bed support 50, these brackets being provided with adjustable bearing screws 256 upon which the other end of the supporting table rests. In order to prevent separation of the bearing screws and the table tension springs 257 are provided which are connected at one end to the table and at the other end to the brackets 255. As it is most important to feed the material smoothly onto the work bed at the supply side the pivoted table is provided at this point, but it is not so essential that the support exactly follow the conveyor on the discharge side, and hence at the opposite side of the work bed a fixed table 258 is provided. If the conveyor is intended to be operated in an opposite direction the positions of the tables 252 and 258 may be reversed, or if desired pivoted tables may be supplied at both sides of the work bed.

Mounted on the cam shaft 25 (Figs. 3 and 6) is a barrel cam 259 provided with the groove 260 in which is disposed a cam roll 261 carried by the arm 262 pivoted to the frame 1 at 263. The free end of the arm 262 is connected by a link 264 to either the upper or lower arm of an angled lever 265 pivotally mounted at 266 on the bracket 239. The purpose of this variable connection is to provide for driving the conveyor in either direction, and in the present instance the link 264 is shown as connected to the upper arm of lever 265. Also connected to the upper arm of lever 265 is a link 267, the other end of which is pivotally connected to a pawl carrier 268 (Figs. 6, 8 and 9). In order to vary the throw of the pawl carrier the link 267 is pivotally connected to a slide block 269 movable in the pawl carrier, and this block is adjusted by the screw 270 having a threaded connection therewith, the upper end of the screw being provided with a spiral gear 271 meshing with a second spiral gear 272 rigid on the end of a shaft 273 (Fig. 10) extending through the conveyor roll 243 and provided at its other end with an adjusting handle or crank 274. Mounted in the handle 274 is a spring-pressed detent 275 which is adapted to engage anyone of a series of recesses 276 formed in a dial 277, which latter is pinned to one end of a tubular shaft 278 surrounding the shaft 273, the other end of the tubular shaft being pinned to the pawl carrier 268. Surrounding the shaft 278 is a second tubular shaft 279 journalled in the ends of the conveyor brackets 239, and the conveyor roll 243 is pinned and keyed to this shaft. Also keyed to the shaft 279 are two rigidly connected ratchet wheels 280 and 281, the teeth of which are inclined in opposite directions. A pawl arm 282 is secured to a stub shaft 282′ journalled in the upper end of the pawl carrier 268, and secured in the pawl arm is a pawl 283 having on opposite ends the laterally offset teeth 284 and 285. Also secured to the stub shaft 282′ is a short rock arm 286 to which one end of a coil spring 287 is connected, the other end of the spring being secured to the pawl carrier. In the position shown in full lines in Fig. 8 the pawl tooth 285 is shown as engaging the ratchet 281 so as to drive the roll 243 in an anti-clockwise direction. By throwing the pawl arm over, the tooth 284 may be caused to engage ratchet 280 and drive the roll in a clockwise direction. Hence it will be seen that all that is necessary to reverse the direction of the conveyor is to disconnect the link 264 from one end of the lever 265 and connect it to the other and reverse the position of the pawl arm 282.

*Gauge.*

Attached to the front edge of the work bed 53 is a dovetailed slide 288 upon which is adapted to move the body 289 of a gauge for the sole stock. Vertically reciprocable in the bore 289′ in the body is a cylindrical extension 290 of a gauge block 291, the lower end of the extension being reduced in diameter and threaded as shown at 292. Mounted on the threaded portion 292 is an adjusting nut 293, and at an intermediate point of the threaded portion the bore of the body 289 is provided with an inwardly projecting ledge 294. On each side of this ledge coil springs 295 are provided surrounding the threaded portion 292. These springs yieldingly hold the extension 290 in a balanced position, and upon pulling up the extension the lower spring is compressed while by pressing down upon the extension the upper spring will be compressed. The extension 290 is provided at one side with a vertical groove 296 at the bottom of which a quadrangular recess 297 is provided, and a stop pin 298 extends through the body 289 into the groove 296, thereby preventing rotation of the block 291 but allowing upward and downward movement thereof. However, by pulling up the block 291 until the pin 298 is opposite the quadrangular portion 297 the black may then be given a movement of rotation of 90°. Slidable and rotatable in the block 291 is a gauge rod 299, one end of which is provided with a gauge roll 300 and a gauge arm 301 immediately adjacent said roll, while the opposite end of the rod is provided with a handle 302. Slidably mounted in the block 291 is a locking block 303 which is provided with a slightly elliptical cut-away portion partly surrounding the gauge rod 299. The upper end of the locking block is threaded as shown at 304 and is provided with the lock nut 305. By actuation of this lock nut the locking block 303 may be drawn upwardly to tightly engage the gauge rod 299 so as to prevent rotation or sliding movement thereof.

*Operation.*

In operation the desired size of sole pattern 73 is attached to the sole pattern bracket and the actuating mechanisms of the drive bonnet 85 and leader 130 are adjusted to give the proper movement to them if a sole other than an intermediate size is to be cut. The desired brand and size dies are connected to the embossing die block 222 and the latter adjusted to properly position it with reference to the opening 80' in the sole pattern. If a plain edge sole is to be cut the knife 154 is withdrawn from operative position and the curved knife 156 set in the proper cutting position as in Fig. 4. The toggle for moving the work bed is set by adjustment of the hand wheel 40 for the correct clamping pressure on the stock and the toggle for varying the throw of the embossing dies is also properly adjusted by actuation of the hand wheel 207. The conveyor is also set to impart the proper feed movement for the size sole to be cut, by actuation of the handle 274 which varies the throw of the pawl arm 268. The gauge body 289 is then slid along the work bed until it is opposite the pattern 73 and the gauge rod moved inwardly to bring the gauge arm 301 against the shoulder 76 at the heel of the sole pattern. The gauge is locked in that position by means of the nut 305 and it is then slid out to a position slightly to the right of the work bed. The operator places a strip of sole stock 306 on a second strip 307 formed of rag stock (Fig. 12) and the two are then placed on the conveyor 244. The rag stock is used to receive the lower end of the cutting blade and thereby prevent injury to the conveyor. The operator places the forward edge of the stock in such position that the roll 300 of the gauge presses on its side against the edge or breast of the thickened heel portion of the stock as shown in Fig. 9. The machine is then started, the stock fed beneath the sole pattern, and when the knife is about the position shown at C in Fig. 16 the work bed starts to rise, and about the time the knife has reached the position shown at D the work bed has clamped the stock against the sole pattern and the actual cutting of the sole begins. When cutting a plain edge sole the knife travels completely around the sole pattern to finish the cutting at the point D. The knife then continues around the pattern a second time and as it reaches a point about as indicated at E the table starts to drop, carrying with it the stock, which operation causes the outwardly projecting end of the knife to cut upwardly through the surrounding waste stock. The knife then continues around the pattern and the conveyor feed operates to bring a new portion of stock beneath the sole pattern. About the time the knife reaches the point C on its second revolution the table starts to rise again and at D the cutting operation again begins.

When cutting a roll edge or under bevelled sole the straight knife 154 is used, and the actual cutting operation is exactly the same as that described for a plain edge sole. It will be seen, however, that the knife 154 projects beneath the pattern (Fig. 12) and if it were left in this position at the finish of a cutting operation it would cut through the sole as the work bed dropped and ruin the sole. This is due to the fact that the stock is so tacky that the cut sole tends to adhere rather strongly to the waste stock surrounding it and hence drops with the waste stock when the work bed is lowered. In order to prevent injury to the sole the tracker mechanism shown in Figs. 16 to 19 is used. The knife 154 begins the cutting operation at about the point D as before and shortly after it passes the point E the tracker roll 161 engages the spring 163 of the tracker, thereby rocking the latter from the position shown in Fig. 16 to that shown in Fig. 17. The knife then continues on its first revolution until the sole cutting is completed at the point D. As the knife in its continued movement reaches substantially the point E, however, the tracker roll 161 passes on to the tracker bar 162 as shown in Fig. 17, and the curved form of the latter causes the knife block holder 144 and the supported knife to swing outwardly so that the end of the knife blade 154 is drawn from beneath the sole pattern. Shortly after the tracker roll 161 engages the tracker bar 162 the work bed starts to drop as before, and as the tracker roll passes off the opposite end of the tracker bar it rocks the latter and again disposes it in the position shown in Fig. 16. Due to the spring 146 on the knife block holder the knife then swings back against the pattern and after reaching the point C the next sole cutting cycle begins. The tracker is of course unnecessary when cutting plain edge soles, for reasons above stated, and a leader without a tracker may be used at such time.

After the strip of stock has been run completely through the machine the latter is stopped, the strip removed, and the operator then places a fresh strip on the conveyor and proceeds with the cutting operation as above described. As the stock is without the alternating brand marks as used with the previous machines the spacing between successive cut soles may be as close as practicable, thereby considerably increasing the output of cut soles from each strip of stock and also greatly reducing the amount of scrap. In addition the time occupied in hand stamping the sizes and later printing the sizes on the finished articles is saved, and owing to the wholly automatic process of cutting and simultaneously embossing any size sole with any desired bevel the output per unit of time is very greatly increased. It is obvious that the machine is as well adapted for cutting smooth surfaced sole stock as the knurled or rough surface sole stock described.

When small size soles such as children's are to be cut the extension 65 and thrust rod 229 are removed, as well as the embossing slide block 214 and die block 222. The rear pattern supporting arm 69 is then directly connected to the arm 64 of the sole pattern bracket and the small sole pattern placed in position. A small embossing die slide 214 and die block 222 are also attached to the slide 209. Irrespective of the size of the sole pattern used it will be seen that it has a slight swivel movement on the pivotal connection 57 of the sole pattern bracket, by reason of which the pattern can readily align itself with the stock.

At the beginning of a sole cutting operation the embossing dies move rapidly downward due to their toggle actuation and the shape of the actuating cam, which movement is slowed down just as the dies come in contact with the stock. This contact occurs at about the time the work bed has clamped the stock against the pattern, when the knife is in about the position D in Fig. 16. The pressure of the dies reaches its maximum when the knife has cut about three-quarters of the way around the pattern, and the dies then start to rise. As the stock is still clamped by the pattern at this time the latter acts as a stripper for the dies. The dies then remain elevated until the next sole cutting operation begins. With the previous types of machines for cutting plain edge soles an embossing mechanism of the type shown could not be used, as the cutting knife projects inwardly over the pattern and at the shank of the pattern, which is rather narrow, the knife projects inwardly so far that there would be no room for the embossing mechanism. However, by the use of the curved knife 156 this difficulty is completely obviated. By reason of the complete independence of the embossing mechanism from the sole cutting mechanism, the required light pressure on the sole pattern can be obtained with the comparatively heavy pressure on the dies which is necessary to obtain a good impression. The die pressure is preferably about 400 lbs. or even higher, in the case of large size dies. By the use of a single die I am not only able to emboss all soles irrespective of the bevel on which they are cut and simultaneously with the cutting, but I am also enabled to run the conveyor belt across the work bed, which causes a much more uniform and accurate feed than when two conveyors are used disposed at opposite sides of the work bed. The use of co-operating dies would of course prevent the adoption of such a type of conveyor. By reason of the thrust rod 229 and the adjustability of the slide 214 and block 222 the dies may be readily adjusted so that the thrust of the slide 209 will be centralized upon the dies, and by reason of the adjustability of the dies in a longitudinal direction they may be set at any desired point in the opening 80' of the sole pattern when the latter is changed for a different size. Also by reason of this adjustment and the accurate feed of an automatic conveyor the die marks will always be properly centered on the shank of the sole. Owing to the heavy pressure and form of die a very clear raised impression is obtained which does not become blurred when later varnished, as in the case with a stamped-in impression. By reason of the flattened outer retaining edge 237 of the die, flow of the stock from beneath the die is prevented, which would not be the case if this edge were not used. A sharp edge cannot be used at this point for the reason it would cut through the stock. As the stock beneath the die is completely retained it is only very slightly thinned by the embossing operation, which thinning is due to the small amount of stock flowing laterally within the die area and up into the embossing recesses. Hence there is no substantial weakening of the stock at the embossed portion to later cause defects in the finished article.

By reason of the central universally adjustable support 52 of the work bed it may be readily properly aligned to take care of any irregularities and held in position by the screws 54. At the same time this central support completely takes care of the pressure from the embossing dies, and in case of injury the work bed can be readily removed and a new one substituted.

While the work bed is automatically raised and lowered during the normal operation of the machine, it may be also manually operated by actuation of the foot lever 34, and this feature is valuable when adjusting the machine for any purpose such as when changing sizes, varying the thickness of the stock, adjusting the cutting knives, or when for any other purpose, it is desired to first make a test and see if the machine is properly adjusted. The manual operation of the entire machine at this time by means of the crank 19 at the front is also very convenient. Owing to the peculiar nature of the material used, or by reason of improper adjustments it may sometimes occur that the knife will break or the stock become jammed in some manner, and in such case the work bed may be immediately released from the stock by withdrawing the detent 49 and swinging the crank 46 over from one position to the opposite one.

As before stated the conveyor extends across the work bed 53, which causes the stock to be more accurately fed than in the case where two separate conveyors are used and the use of a single embossing die permits the employment of such a type conveyor. By the use of a pivotally mounted table beneath the conveyor at the inlet side of the machine any sagging of the conveyor and the stock supported thereon, which would tend to cause an uneven feed, is prevented. By reason of the location of the machine and for other considerations some factories desire a machine in which the feed is from right to left, while others prefer to feed from left to right. By provision of the conveyor drive connection 264—265 and the double ratchet and pawl mechanism the machine may be almost instantly altered to feed in either direction. Where the machine is to be continuously used with the feed in one particular direction one pivotally supported table may be used, but where the feed is to be changed at intervals it is preferable as before stated to provide a rising and falling table on each side of the work bed.

By the use of the gauge 300—301 the operator can readily position the stock on the conveyor so that the breast of the heel portion will be exactly in alignment with the shoulder 76 on the sole pattern. If, however, for any reason it is desired to temporarily move the gauge out of the way it is merely lifted until the stop pin 298 comes opposite the quadrangular groove 297, when the gauge may be swung to a position parallel with the conveyor so as to entirely clear the latter.

It will be seen that by my invention a blank cutting machine has been provided, in the present instance specifically a sole cutting machine, which is easily operated, has a greatly increased capacity over the machines of the prior art, allows of the accurate cutting with any desired bevel and simultaneous embossing of various styles and sizes of blanks, in which the parts can be adjusted or replaced with the greatest ease, and which is comparatively quiet in operation, due to the absence of the complicated chain drive previously used and consequent excessive play of the parts.

While a specific embodiment of the invention has been shown and described it is obvious that numerous modifications in the details will suggest themselves to those skilled in the art, and it is not desired that the invention be limited otherwise than as set forth in the appended claims.

Having thus described my invention what I claim and desire to protect by Letters Patent is:

1. In a blank cutting machine, a flat knife guiding form, means for moving a knife therearound, a flat work bed cooperating with the form, means including a lever for relatively moving the form and bed to clamp a sheet of stock, and automatic and manual actuating means for said lever.

2. In a blank cutting machine, a knife guiding form, means for moving a knife therearound, a work bed, means including a lever for relatively moving the form and bed to clamp a sheet of stock, and automatic and manual actuating means for said lever, said manual actuating means including a lost motion connection with said lever.

3. In a blank cutting machine, a knife guiding form, means for moving a knife therearound, a work bed, means including a lever for relatively moving the form and bed to clamp a sheet of stock, automatic and manual actuating means for said lever, and manual means for releasing the clamped stock when desired.

4. In a blank cutting machine, a knife guiding form, means for moving a knife therearound, a work bed support, a work bed mounted for universal movement thereon, means for locking together said work bed and support, and means for relatively moving the form and support to clamp the stock between said form and bed.

5. In a blank cutting machine, a knife guiding form, means for moving a knife therearound, a work bed support having a central spherically curved recess, a work bed having a correspondingly curved projection adapted to engage said recess, means for adjusting the bed on its support and for securing it in adjusted position, and means for relatively moving the form and support to clamp the stock between said form and bed.

6. In a blank cutting machine, a knife guiding form, means for moving a knife therearound, a work support, means for moving the same to clamp stock to said form, conveyor means for feeding stock between said form and work support, flat conveyor supports at opposite sides of and adjacent said work support, and means for moving one end of one of said conveyor supports in unison with the work support.

7. In a blank cutting machine, a knife guiding form, means for moving a knife therearound, a work support, means for moving the same to clamp stock to said form, a conveyor movable between said form and work support, and conveyor supports at opposite sides of said work support and terminating adjacent the latter, one of said conveyor supports being pivotally mounted at its end remote from the work support and adjustably connected to the latter at the other end.

8. A blank cutting machine comprising a work bed, a form having a peripheral knife guiding edge and cooperating with the bed to clamp a sheet of stock, a knife carrier relatively movable with respect to said edge of the form, means on said carrier whereby a knife may be presented to said edge at an inclination to either side of a perpendicular to the bed, and means for laterally withdrawing the knife from beneath the form.

9. A blank cutting machine comprising means for clamping a sheet of stock at the cutting point, cutting means comprising straight and curved blades the cutting edges of which engage the stock at angles oppositely inclined to the perpendicular, means whereby either of said blades may be disposed in operative position, and means for relatively moving the clamping means and cutting means to cut a blank from the stock.

10. A blank cutting machine comprising a bed, a knife guiding form, means for relatively moving the two to clamp a sheet of stock therebetween at the cutting point, a cutter carrying element, cutting means secured therein operating upon the same side of the stock for cutting with either an under or over cut bevel, and means for driving said element to cut the stock.

11. A knife carrier for blank cutting machines comprising a knife block holder, a knife block pivotally adjustable therein, oppositely inclined knives in said block, and unitary means for securing said knives.

12. A knife carrier for blank cutting machines comprising a knife block holder, a knife block mounted on a pivot pin therein, said block having a knife socket, and means including said pivot pin for securing a knife in said socket.

13. A knife carrier for blank cutting machines comprising a knife block holder, a knife block mounted on a pivot pin therein, said block having a knife socket, and a knife clamp actuable by said pivot pin for securing a knife in said socket.

14. A blank cutting machine comprising means for clamping stock including a cutting guide, means normally contacting with said guide for cutting a blank, and means actuated into operative position by the cutting means for withdrawing the latter from contact with said guide.

15. In a blank cutting machine, means for clamping stock including a knife guiding form, means for driving a knife therearound with its point beneath said form, and means for withdrawing said knife from the form at the end of a cutting operation and prior to releasing the stock.

16. A blank cutting machine comprising a bed, a knife guiding form, means for relatively moving the two to clamp a sheet of stock therebetween, a knife carrying element, means for driving the latter around said form, and knife retracting means movable by said element to operative position at the beginning of a cutting operation.

17. A blank cutting machine comprising a bed, a knife guiding form, means for relatively moving the two to clamp a sheet of stock therebetween, a knife carrying element, means for driving the latter around the form, and means for guiding said knife away from said form at the end of a cutting operation during the forward movement of the knife carrying element.

18. A blank cutting machine comprising a bed, a knife guiding form, means for relatively moving the two to clamp a sheet of stock therebetween, a knife carrying element supported above the bed, means for driving the latter around the form, and guiding means settable by said element for laterally withdrawing the knife after cutting a blank.

19. A blank cutting machine comprising a bed, a knife guiding form, means for relatively moving the two to clamp a sheet of stock therebetween, a knife carrying element, means for driving the latter, and pivotally mounted means alternately movable by said knife carrying element into and out of knife guiding position.

20. A blank cutting machine comprising a bed, a knife guiding form, means for relatively moving the two to clamp a sheet of stock therebetween, a knife carrying element, means for driving the latter around the form, and means for guiding the knife during forward movement of the same out of cooperation with the form at a relatively fixed point on the latter.

21. In a blank cutting machine, a knife guiding form, a knife, means for moving the knife therearound, a leader cooperating with said means, and means supported by the leader for guiding the knife out of cooperation with said form.

22. In a blank cutting machine, a knife guiding form, means for moving a knife therearound, a leader cooperating with said means, and means pivotally mounted on the lower side of the leader and operable by the knife moving means first to be set in knife guiding position and then to guide the knife away from the form.

23. A blank cutting machine comprising a bed, a knife guiding form, means for intermittently relatively moving the two to clamp a sheet of stock therebetween, a knife carrying element, means for driving the latter around said form, and pivotally mounted means adapted to be moved to operative position by the knife guiding element during the first revolution and adapted to guide the knife out of contact with the form during the second revolution.

24. In a blank cutting machine, a knife guiding form, means for moving a knife around the form, a leader cooperating with said means, and a knife guiding means pivoted to the leader adjacent the path of the knife moving means, said last means including a yielding element movable by the knife moving means in its first revolution to set the knife guiding means in operative position for the second revolution.

25. A blank cutting machine comprising a bed, an overhanging arm, a bracket pivotally mounted thereon, yielding means tending to tilt said bracket, a form carried by the bracket, means for relatively moving said form and bed to clamp a sheet of stock therebetween, and means cooperating with said form to cut the stock.

26. A blank cutting machine comprising a bed, an overhanging arm, a bracket having a horizontal pivotal connection therewith, yielding means tending to tilt said bracket, a knife guiding form carried by the bracket, means for relatively moving said form and bed to clamp a sheet of stock therebetween, and knife carrying means movable around said form.

27. A support for sole cutting forms comprising a bracket, a fixed supporting arm carried thereby, a bracket extension, a second supporting arm, means whereby said second arm may be either directly connected to said bracket or indirectly through said extension, and means for detachably connecting a sole form to said arms.

28. In a machine for cutting blanks from sheet stock, means for clamping the stock, means for cutting a blank therefrom, means for driving the cutting means around the form, and a single die movable independently of the clamping means for embossing the blank simultaneously with the cutting thereof.

29. In a machine for cutting blanks from sheet stock, means for clamping the stock, means for cutting a blank therefrom, and a single die operable independently of any movement derived from the clamping means cooperating with said clamping means to form a raised impression on the stock.

30. In a machine for cutting blanks from sheet rubber, opposed sheet clamping means, sheet cutting means, and a single die operable independently of any movement derived from the sheet clamping means movable through one of said clamping means and cooperating with the other to form a raised impression on the sheet.

31. In a machine for cutting blanks from sheet rubber, a bed, an apertured form coacting therewith to clamp the stock, a knife coacting with said form to cut the stock, and an independent female die movable through said aperture and cooperating with the bed to form a raised impression on the stock.

32. In a machine for cutting blanks from sheet rubber, a bed, an apertured form relatively movable thereto to clamp the stock, a knife movable around said form to cut the stock, a female die pivotally mounted above said aperture, and means for actuating said die.

33. In a machine for cutting blanks from sheet rubber, a bed, an apertured form, means for relatively moving the two to clamp the stock, a knife coacting with said form to cut the stock, a female die pivotally mounted above said aperture, means for adjusting said die, and means for actuating the die.

34. In a machine for cutting blanks from sheet rubber, a bed, an apertured form relatively movable thereto to clamp the stock, a knife coacting with said form to cut the stock, a female die movable independently of the form through said aperture and coacting with the bed to form a raised impression, and means for retracting said die prior to releasing the stock, whereby the form may act as a stripper.

35. In a machine for cutting blanks from sheet rubber, a bed, a form relatively movable thereto to clamp the stock, a knife coacting with said form to cut the stock, means operable independently of the form to produce a raised impression on the stock, and means for releasing said last means prior to releasing the stock, whereby the form may act as a stripper.

36. In a machine for cutting blanks from sheet stock, sheet clamping means, a sheet conveyor movable therebetween, blank cutting means movable around said clamping means, and means operable independently of the sheet clamping means for producing a raised impression on the blank during the cutting operation.

37. A sole stock gauging mechanism for sole cutting machines comprising a gauge mounted for movement towards and from a sole pattern whereby the gauge may be set when positioned at the sole pattern and moved away therefrom, and means for securing the gauge in advance of the sole pattern to position sole stock fed to the sole pattern.

38. A sole stock gauging mechanism for sole cutting machines having fixedly connected sole pattern and stock engaging members comprising a gauge movable towards and from the sole pattern whereby the gauge may be engaged with the sole pattern for setting and then moved away therefrom to a gauging position in front of the sole pattern for stock gauging purposes, and means for securing the gauge in gauging position.

39. In a sole cutting machine, a sole pattern having a shoulder for engagement with the heel breast of a stock sheet, a gage movable to contact with said shoulder, means carried thereby for indicating the proper position of the stock sheet, and means whereby the gage may be positioned in advance of the sole pattern.

40. In a sole cutting machine, a sole pattern having a sole stock heel breast engaging shoulder, a gage adapted to coact with the heel breast of the stock for positioning the latter, and means whereby said gage may be set from the shoulder on said pattern.

41. In a sole cutting machine, a sole pattern having a sole stock heel breast engaging shoulder, a gage body adjustable parallel with said shoulder, a gage rod adjustable in said body at right angles to said shoulder, a gage roll carried by said rod for engagement with the heel breast, and means carried by the rod for setting said roll from said shoulder.

42. In a sole cutting machine, a sole pattern having a sole stock heel breast engaging shoulder, a gage body adjustable parallel with said shoulder, a gage rod adjustable in said body at right angles to said shoulder, a gage roll carried by said rod for engagement with the heel breast, means carried by the rod for setting said roll from said shoulder, and means whereby the gage may be moved to inoperative position.

43. In a machine for cutting blanks from sheet rubber, the combination of cutting means, whereby without reversing the stock a sole having either an undercut or an overcut bevel may be formed, and a single means acting simultaneously with the cutting means for embossing the sole with a raised design.

44. In a machine for cutting rubber soles, in combination, an endless conveyor, cutting mechanism adapted to over-cut or under-cut without changing the position of the stock on the conveyor, and means whereby a sole may be embossed on its external surface with a raised design without impairing its smooth inner surface.

45. In a machine for cutting blanks of sheet rubber, in combination, means for cutting a blank with an under-bevel or with an over-bevel without reversing the stock, and means for retracting the knife when using an under-cut bevel to prevent injury to the fully cut soles.

Signed at New Haven, county of New Haven, and State of Connecticut this 28th day of February, 1923.

ROLAND G. ANDERSON.